United States Patent
Strong et al.

(10) Patent No.: US 10,523,444 B2
(45) Date of Patent: *Dec. 31, 2019

(54) SOLID STATE STORAGE DEVICE WITH COMMAND AND CONTROL ACCESS

(71) Applicant: Micron Technology, Inc., Boise, ID (US)

(72) Inventors: Robert W. Strong, Folsom, CA (US); Hemaprabhu Jayanna, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,001

(22) Filed: Oct. 19, 2018

(65) Prior Publication Data

US 2019/0058598 A1    Feb. 21, 2019

Related U.S. Application Data

(63) Continuation of application No. 15/876,387, filed on Jan. 22, 2018, now Pat. No. 10,142,112, which is a continuation of application No. 14/804,426, filed on Jul. 21, 2015, now Pat. No. 9,900,159.

(51) Int. Cl.

| | |
|---|---|
| *H04L 9/32* | (2006.01) |
| *G06F 21/60* | (2013.01) |
| *G06F 21/62* | (2013.01) |
| *G06F 21/79* | (2013.01) |

(52) U.S. Cl.
CPC .......... *H04L 9/3247* (2013.01); *G06F 21/602* (2013.01); *G06F 21/6218* (2013.01); *G06F 21/79* (2013.01); *H04L 2209/24* (2013.01); *H04L 2209/72* (2013.01)

(58) Field of Classification Search
CPC .... G06F 21/602; G06F 21/6218; G06F 21/79; H04L 2209/24; H04L 2209/72; H04L 9/3247

See application file for complete search history.

(56) References Cited

U.S. PATENT DOCUMENTS

| | | | |
|---|---|---|---|
| 7,657,941 B1* | 2/2010 | Zaitsev | ................. G06F 21/567 380/59 |
| 9,900,159 B2 | 2/2018 | Strong et al. | |
| 2008/0172560 A1* | 7/2008 | Hughes | ................. H04L 9/3236 713/176 |
| 2011/0167484 A1 | 7/2011 | Hammell et al. | |
| 2017/0026183 A1 | 1/2017 | Strong et al. | |
| 2018/0159692 A1 | 6/2018 | Strong et al. | |

* cited by examiner

*Primary Examiner* — Abiy Getachew
(74) *Attorney, Agent, or Firm* — Perkins Coie LLP

(57) ABSTRACT

Several embodiments of memory devices and systems with command and control access are described herein. In one embodiment, a memory device includes a controller having a processor and a memory component operably coupled to the processor. The controller is configured to receive at least one command and control ($C^2$) packet from a remote computer associated with a device vendor. The $C^2$ packet includes a request for the controller to perform a restricted command, and a vendor signature. The memory component stores instructions executable by the processor to determine if the vendor signature is valid and to direct the controller to perform the restricted command if the vendor signature is determined to be valid.

21 Claims, 6 Drawing Sheets

SOLID STATE STORAGE DEVICE WITH COMMAND AND CONTROL ACCESS

CROSS-REFERENCE TO RELATED APPLICATION

This application is a continuation of U.S. application Ser. No. 15/876,387, filed Jan. 22, 2018; which is a continuation of U.S. application Ser. No. 14/804,426, filed Jul. 21, 2015, now U.S. Pat. No. 9,900,159; each of which is incorporated herein by reference in its entirety.

TECHNICAL FIELD

The disclosed embodiments relate to memory devices and systems. In particular, the disclosed embodiments relate to methods for authorizing and validating a request for a memory device, such as a solid-state drive (SSD), to perform a restricted command.

BACKGROUND

SSDs use non-volatile, solid-state storage media, such as flash media, to persistently store large amounts of data. SSDs can operate in a manner similar to conventional hard disk drives (HDDs), but lack the motor, magnetic disc, read head, and other moving components of HDDs. The lack of moving parts makes SSDs more rugged than HDDs. For example, when an HDD is dropped or shaken, the read head can collide with and sometimes damage the rotating magnetic disc. Additionally, SSDs have faster read/write speeds than HDDs, and they make virtually no noise.

Another advantage of the solid state media of SSDs is that it gives an SSD greater extensibility than an HDD. For example, HDDs typically require a data file to be stored in contiguous memory blocks because the read head needs to read the magnetic media in one continuous motion. By contrast, SSDs can store memory blocks for any one file at arbitrary locations in the solid state media. Additionally, some SSDs can dynamically reduce, or "trim," memory capacity in exchange for a faster read/write speed.

Some extensible features include restricted commands such as commands for electrically testing the SSD during production or in the field. These commands are typically locked out via password protection to prevent novice or other users from executing them because, in certain cases, the restricted commands may irreversibly alter the SSD and even render it inoperable. For example, some restricted commands can erase or wipe out critical portions of the SSD firmware. One challenge with conventional password protection, however, is that it can be circumvented once a password becomes public knowledge.

DETAILED DESCRIPTION

As described in greater detail below, the technology disclosed herein relates to memory devices, systems with memory devices, and related methods for authorizing and validating a request for a memory device to enable or disable a restricted command. A person skilled in the relevant art, however, will understand that the technology may have additional embodiments and that the technology may be practiced without several of the details of the embodiments described below with reference to FIGS. 1-6. In the illustrated embodiments below, the memory devices are described in the context of SSDs incorporating solid-state storage media (e.g., flash storage media). Memory devices configured in accordance with other embodiments of the present technology, however, can include other types of storage media, such as magnetic storage media. For example, a memory device configured in accordance with one embodiment can include an HDD.

Figure 1:
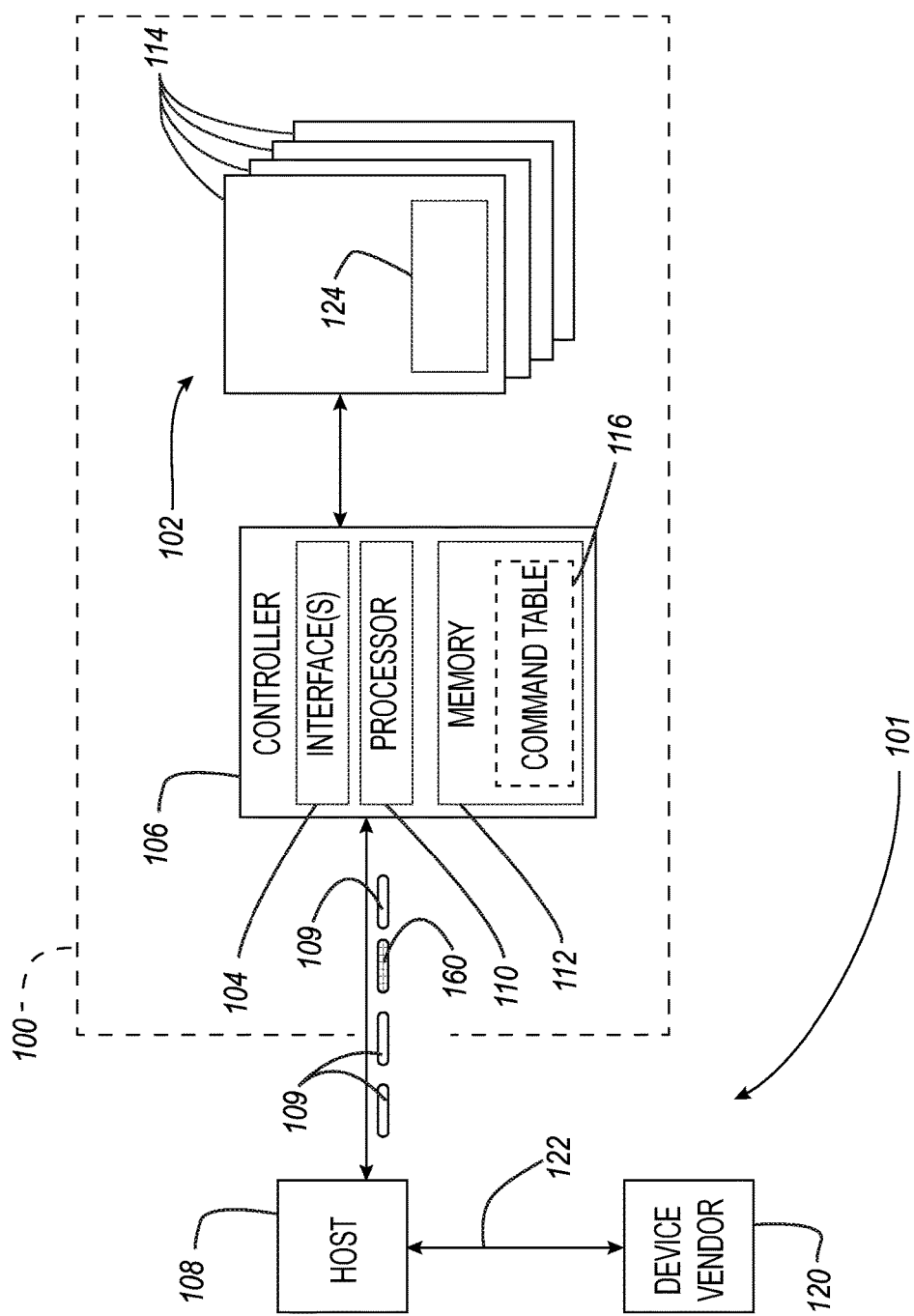
FIG. 1 is a block diagram of a system having a memory device configured in accordance with an embodiment of the present technology.

FIG. 1 is a block diagram of a system 101 having a memory device or SSD 100 configured in accordance with an embodiment of the present technology. As shown, the SSD 100 includes a main memory component 102 ("main memory 102") and a memory controller 106 ("controller 106") operably coupling the main memory 102 to a host device 108 (e.g., an upstream central processor (CPU)) via one or more controller interfaces 104. In some embodiments, the host device 108 and the controller 106 can communicate over a serial interface (e.g., a computer system interface (SCSI), a serial AT attachment (ATA) interface, a peripheral component interconnect express (PCIe) interface, etc.), a test and/or debugging interface, and/or another suitable interface (e.g., a parallel interface). As described in greater detail below, the controller interfaces 104 can further include one or more restricted interfaces (e.g., a joint test action group (JTAG) interface) that can be locked-out to the host device 108 by default.

As further shown in FIG. 1, the main memory 102 includes a plurality of memory units 114 that each include a plurality of memory cells (not shown). The memory cells can include, for example, floating gate, capacitive, ferroelectric, magnetoresitive, and/or other suitable storage elements configured to store a data state persistently or semi-persistently. The main memory 102 and/or the individual memory units 114 can also include other circuit components (not shown), such as multiplexers, decoders, buffers, read/write drivers, address registers, data out/data in registers, etc., for accessing and programming (e.g., reading/writing) memory cells in the main memory 102 and/or performing other commands, such as processing information and/or enabling communication with the controller 106. In one embodiment, each of the memory units 114 can be formed from a semiconductor die and arranged with other memory unit dies in a single device package (not shown). In other embodiments, one or more of the memory units can be co-located on a single die and/or distributed across multiple device packages.

The controller 106 can be a microcontroller, special purpose logic circuitry (e.g., a field programmable gate array (FPGA), an application specific integrated circuit (ASIC), etc.), or other suitable processors. The controller 106 can include a processor 110 configured to execute instructions stored in an internal memory component 112 (e.g., non-volatile memory) to perform various processes, logic flows, and routines for controlling operation of the SSD 100 and managing communications between the SSD 100 and the host device 108. In general, the controller 106 can directly access and program (i.e., read and/or write) the memory units 114. In NAND-based memory units 114, for example, the controller 106 can program selected sub groupings (not shown) of memory cells (known to those skilled in the art as memory pages) and/or larger groupings (not shown) of memory cells (known to those of ordinary skill in the art as memory blocks).

The host device 108 accesses the main memory 102 of the SSD 100 by sending control messages or packets 109 to the controller 106. The control packets 109 typically include a payload field (not shown) containing a request that is to be performed or executed by the controller 106. Such a request can include, for example, a request to program the memory, e.g., a request to program (e.g., read/write) the main memory 102. The payload can also include an address or range of addresses identifying a particular region (e.g., a memory block or memory page) of the main memory 102 to be programmed or otherwise accessed. Typically, the controller 106 can translate these addresses into native memory addresses recognizable by the main memory 102 via, e.g., a flash translation layer. The control packet 109 can also include other fields (not shown), such as a header field, containing information that can include, e.g., host identification, model and/or serial number of the SSD 100, time/date information, a nonce value, and/or other information.

When the controller 106 receives the control packets 109, the controller 106 processes the control packets 109 by, e.g., decapsulating the packets, evaluating certain header information, identifying the requested commands(s) in the packet payload, etc. The controller 106 then performs the commands(s) (e.g., read/write commands) in the packets 109 requested by the host device 108. For example, when the host device 108 requests the controller 106 to read the main memory 102, the controller 106 can read out data from the main memory 102 at a requested memory address. The controller 106 will then return this data to the host device 108 in a return packet (not shown).

In the embodiment illustrated in FIG. 1, the controller 106 is further configured to validate certain types of control packets containing requests to perform enable or disable commands. In some embodiments described below, the enable/disable commands are used to enable or disable restricted commands, such as programming, reading, and/or other memory accessing commands, that are provided by a device vendor 120 for use on the SSD 100. Such restricted commands are referred to, herein, as vendor specific commands, or "VS commands." The device vendor 120 can include, for example, the manufacturer and/or supplier of the SSD 100 and/or the host device 108 (e.g., an original equipment manufacturer (OEM)), and/or an affiliate (e.g., a 3rd party service) of the manufacturer and/or the supplier. The device vendor 120 can provide or host one or more remote computers (not shown), such as remote servers, for authorizing enable or disable commands over a network and/or other suitable connection 122 (e.g., wired, wireless, point-to-point, public, private, serial, parallel, or other data connections) with the host device 108.

VS commands can differ from standard or generic controller commands (e.g., read/write commands) and can include proprietary, customized, and/or other non-standard commands. For example, some VS commands can enable the host device 108 to access (i.e., via the controller 106) a restricted region 124 of the main memory 102, the internal memory component 112 of the controller 106, and/or a restricted interface of the controller interfaces 104 (e.g., a test interface). Certain VS commands can also enable the host device 108 to program restricted regions of the SSD 100 via the controller 106. For example, in some embodiments, a VS command can enable the host device 108 to load data (e.g., a boot block) into firmware (e.g., into the internal memory component 112 of the controller 106).

The enable/disable commands require authorization from the device vendor 120 before the SSD 100 can perform them. As described below, the device vendor 120 authorizes these enable/disable commands by signing the packets with a vendor authorization signature (not shown). When a packet or other similar message is signed, it is referred to herein as a "command and control" ($C^2$) packet 160. In at least some embodiments, the $C^2$ packet 160 is a control packet 109 that includes the vendor signature. As described below, the SSD 100 can include a command table 116 (stored, e.g., in the main memory 102 or in the internal memory component 112, as is shown in the illustrated embodiment) to identify whether a control packet requires a vendor signature. The host device 108 cannot create or append a valid vendor signature to a control packet. Thus, the host device 108 is prevented from carrying out VS commands of the SSD 100 without authorization from the device vendor 120. As further described below, the SSD 100 can validate a vendor signature once it receives a $C^2$ packet 160 to prevent the SSD 100 from executing the enable or disable command of a $C^2$ packet 160 that has a fraudulent or otherwise invalid authorization signature.

In some embodiments, the device vendor 120 can use the command and control capability of the $C^2$ packet 160 to provide extensible, upgradeable, and/or other services to the end user of the SSD 100 and/or the host device 108. For example, the device vendor 120 can send a signed $C^2$ packet 160 to the SSD 100 to enable VS commands that will unlock the restricted region 124 and thereby expand the memory capacity of the SSD 100. In one embodiment, the device vendor 120 can allow a customer to purchase the SSD 100 with a reduced maximum memory capacity (e.g., 1 TB), but with an option to expand the maximum memory capacity (to, e.g., 2 TB) through purchase (e.g., Internet purchase). In this example, when the customer completes such a purchase, the device vendor 120 can send a signed $C^2$ packet 160 to the customer's SSD 100 to enable VS commands that will unlock the restricted region 124 and thereby expand the capacity of the main memory 102. In certain embodiments, the device vendor 120 can use the command and control capability to give service technicians temporary (e.g., time or boot-cycle limited) access to certain restricted VS commands for testing, debugging, or other servicing of the SSD 100 when deployed in the field. In these and other embodiments, the command and control capability can also prevent unauthorized access to hackers and/or unscrupulous users that attempt to access the restricted VS commands of the SSD 100.

Figure 2:
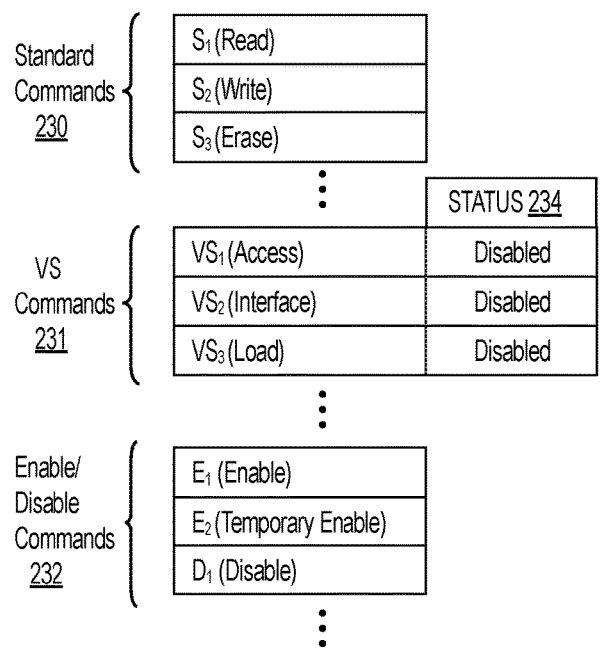
FIG. 2 shows a command table containing various restricted commands that can be performed by a memory device in accordance with embodiments of the present technology.

FIG. 2 shows the command table 116 of FIG. 1 containing various commands that can be performed by the SSD 100 (FIG. 1) in accordance with embodiments of the present technology. As shown, the command table 116 includes Standard commands 230, VS commands 231, and Enable/

Disable commands 232 that can be performed by the SSD 100. The Standard commands 230 can include, for example, conventional commands $S_1$-$S_3$, such as read, write, and erase commands, respectively. The SSD 1000 can perform the Standard 230 commands at the request of the host device 108, and these Standard commands 230 do not need to be enabled by the device vendor 120 (FIG. 1).

The VS commands 231 are vendor specific commands provided by the device vendor 120 that must be first enabled by the device vendor 120 before they can be performed by the SSD 100. In the embodiment illustrated in FIG. 2, the VS commands 231 include a first $VS_1$ command that enables the host device 108 (FIG. 1) to access (e.g., program) the restricted memory 124 (FIG. 1) of the SSD 100, a second $VS_2$ command that enables the host device 108 to use a restricted one of the interfaces 104 (FIG. 1) of the SSD 100, and a third $VS_3$ command that enables the host device 108 to load data (e.g., boot block data) into the internal memory component 112 (FIG. 1) of the SSD 100. In additional or alternate embodiments, the VS commands 231 can include other types of unique, customized, and/or proprietary commands, such as commands for formatting the main memory 102, retrieving restricted data, and/or increasing performance (via, e.g., overclocking). In some of these embodiments, certain VS commands 231 can be enabled by purchase via, e.g., an Internet service. In the embodiment illustrated in FIG. 2, the VS commands 231 can have an associated status indicator 234 that indicates whether a particular VS command is enabled or disabled on the SSD 100.

The Enable/Disable commands 232 are commands performed by the SSD 100 to enable/disable VS commands 231 for use on the SSD 100. For example, in the embodiment illustrated in FIG. 2, the Enable/Disable commands 232 can include an enable $E_1$ command that collectively enables all of the VS commands 231; a temporary enable $E_2$ command that temporarily enables the VS commands 231 for only a limited duration (e.g., a certain number of minutes, hours, days, weeks, months, boot cycles, etc.); and a disable $D_1$ command that collectively disables the VS commands 231. In additional or alternate embodiments, the Enable/Disable commands 232 can include commands that enable and/or disable VS commands 231 individually and/or in collective subsets of VS commands 231. As described below, the Enable/Disable commands 232 can be contained in the payload field of the $C^2$ packet 160 (FIG. 1).

Figure 3:
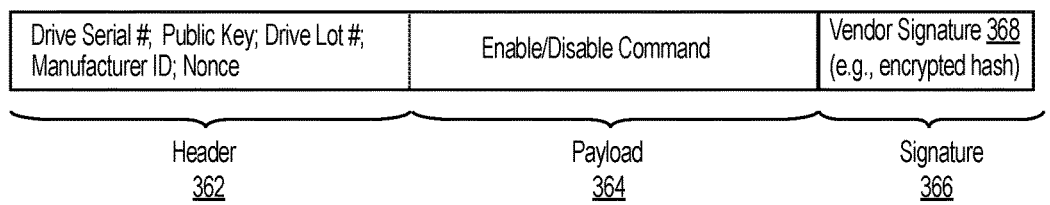
FIG. 3 is a schematic diagram representing a data structure of a command and control packet configured in accordance with an embodiment of the present technology.

FIG. 3 is a schematic diagram of a data structure representing the $C^2$ packet 160 of FIG. 1 in accordance with embodiments of the present technology. In the embodiment illustrated in FIG. 3, the $C^2$ packet 160 contains multiple fields, including a header field 362, a payload field 364, and a signature field 366. The header field 362 can include information that identifies the target SSD 100 (FIG. 1) from or to which the $C^2$ packet 160 is being received or sent, respectively. For example, the header field 362 can include a Drive Serial number, a Drive Lot number, a Manufacturer ID, a public key, a nonce value, and/or other identifying information (not shown). A nonce value can be used by the SSD 100 to thwart any attempts by the host device 108 (FIG. 1) or other device to circumvent authorization and/or validation by replaying a previous packet transmission. In general, the nonce value is incremented from its previous or original value each time the packet is transmitted, which enables the SSD 100 to detect whether a packet is an original transmission or merely a re-played transmission. The payload field 364 can include, for example, the Enable/Disable Command 232 (FIG. 2) requested by the host device 108, the VS command 231 (FIG. 2) to be enabled/disabled, one or more target memory addresses (not shown), and/or other information. In some embodiments, the payload field 364 can be encoded (e.g., encrypted).

The signature field 366 is configured to contain the vendor signature 368 of the device vendor 120 (FIG. 1) when the device vendor signs the C2 packet 160. In some embodiments, the device vendor derives the vendor signature 368 by first computing a digest (e.g., a hash code) based on information contained in the C2 packet 160, such as information stored across the payload field and/or the header field. The device vendor then encodes (e.g., encrypts) this digest to produce a unique code. In such embodiments, this unique code is the vendor signature.

Figure 4A:
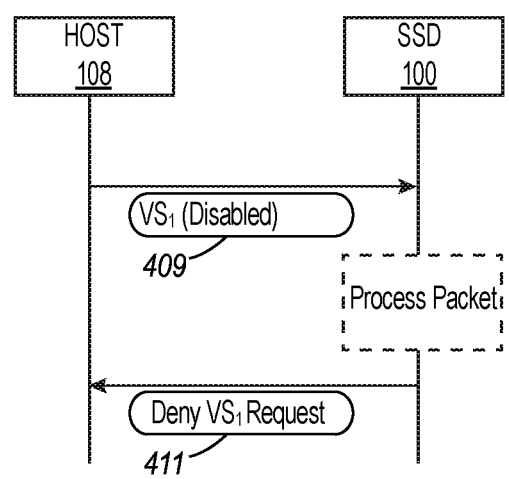
FIGS. 4A and 4B are message flow diagrams illustrating various data exchanges with a memory device in accordance with embodiments of the present technology.
Figure 4B:
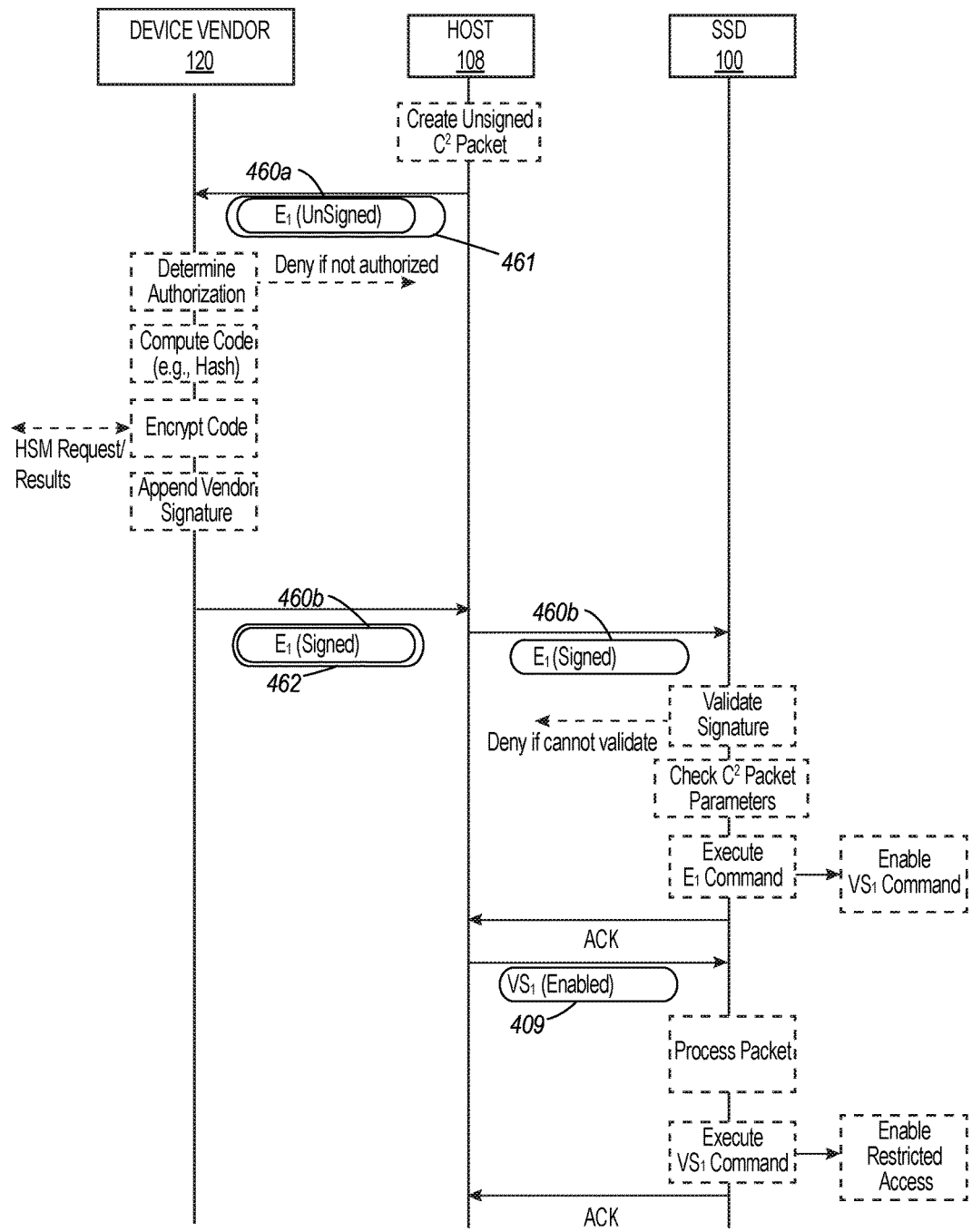

FIGS. 4A and 4B are message flow diagrams illustrating various data exchanges with the SSD 100 of FIG. 1 in accordance with embodiments of the present technology. FIG. 4A shows a series of first message flows between the host device 108 and the SSD 100. In particular, FIG. 4A shows a control packet 409 sent from the host device 108 to the SSD 100 requesting the SSD 100 to perform the first $VS_1$ command. As shown in the command table 116 of FIG. 2, the first $VS_1$ command is currently disabled. Accordingly, when the SSD 100 receives the control packet 409, it will deny the request to perform the first $VS_1$ command. In such cases, the SSD 100 can send a response 411 (e.g., a response packet) to the host device 108 indicating that the request to perform the first $VS_1$ command was denied.

FIG. 4B shows a series of message flows between the host device 108, the SSD 100, and the device vendor 120 for authorizing the first $VS_1$ command denied by the SSD 100 in FIG. 4A. In the illustrated embodiment, the host device 108 creates an unsigned version of a $C^2$ packet 460a. This $C^2$ packet 460a can include, for example, the information in the header field 362 and the payload field 364 discussed above with reference to FIG. 3. However, the unsigned $C^2$ packet 460a does not include a vendor signature 368 (FIG. 3) in the signature field 366 (FIG. 3). For example, the signature field 366 can include a blank or null value. In the embodiment illustrated in FIG. 4B, the payload field 364 includes the enable $E_1$ command (FIG. 2) for enabling all of the VS commands 231 (FIG. 2) of the SSD 100. In other embodiments, however, the payload field 364 can include other types of enable commands, such as the temporary enable $E_2$ command to temporarily enable one or more of the VS commands 231. Further, in other embodiments, the host device 108 can request that one or more of the VS commands 231 be disabled via, e.g., the disable $D_1$ command (FIG. 2). Once the host device 108 creates the unsigned $C^2$ packet 460a, it can send the $C^2$ packet 460a to the device vendor 120 for authorization. For example, in one embodiment, the host device 108 can encapsulate the $C^2$ packet 460a in an IP packet 461 that it can send to the device vendor 120 over an IP network (not shown).

When the device vendor 120 receives the unsigned $C^2$ packet 460a from the host device 108, it first determines whether the enable $E_1$ command is authorized for use on the SSD 100. In some embodiments, authorization can be based on affinity and/or a unique identification associated with the SSD 100, such as the drive serial number, the public key, and/or the model number contained in the header field 362 of the unsigned $C^2$ packet 460a. If authorization is to be granted, the device vendor 120 signs the unsigned $C^2$ packet 460a to produce a signed $C^2$ packet 460b having a vendor signature 368 in the signature field 366 of the packet 460b. The device vendor 120 then sends the signed $C^2$ packet 460b to the SSD 100 via the host device 108, such as via an encapsulated IP packet 462. If authorization is not granted, however, the device vendor 120 can send a response to the host device 108 indicating that the authorization was denied.

Upon receiving the signed $C^2$ packet 460b, the SSD 100 determines whether the vendor signature 368 is valid. If the SSD 100 determines that the vendor signature 368 is, in fact, valid, the SSD 100 will enable the VS commands 231 of the SSD 100. When the VS commands 231 are enabled, the host device 108 can send VS commands 231 directly to the SSD 100 without requiring further device vendor authorization. For example, as further shown in FIG. 4B, the host device 108 can subsequently request the SSD 100 to perform the first $VS_1$ command previously denied by the SSD 100 in FIG. 4A by resending control packet 409 (FIG. 4A) to the SSD 100.

Figure 5:
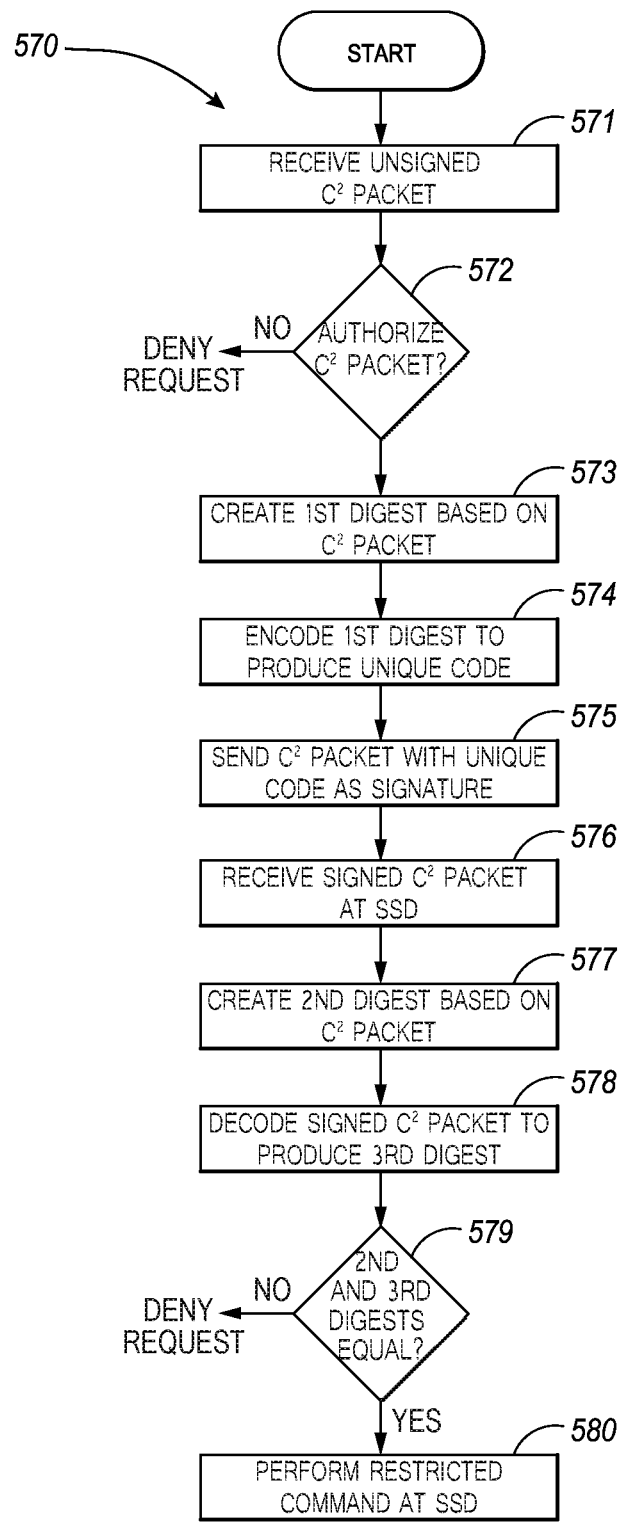
FIG. 5 is a flow diagram illustrating a method for operating a memory device in accordance with an embodiment of the present technology.

FIG. 5 is a flow diagram illustrating a routine 570 for operating a memory device in accordance with an embodiment of the present technology. In one embodiment, the routine 570 can be executed by a combination of the SSD 100 (FIG. 1), the host device 108 (FIG. 1), and/or the device vendor 120 (FIG. 1). The routine 570 begins by receiving an unsigned $C^2$ packet at the device vendor 120 containing a request to perform a restricted command (block 571), such as a request to perform one of the Enable/Disable commands 232 shown in FIG. 2. For example, the routine 570 can begin after the host device 108 creates the unsigned $C^2$ packet 460a (FIG. 4B) and sends this packet to the device vendor 120.

The routine 570 next determines whether to authorize the authorize the C2 packet for use at the SSD 100 (block 572). In some embodiments, the routine 570 determines whether to process the C2 packet based on affinity and/or unique identification associated with the SSD 100, such as the drive serial number, the public key, and/or model number contained in the header field of the unsigned C2 packet. In these and other embodiments, permission can be granted in combination with the SSD 100 identity and the identity of the host device 108, user credentials (e.g., a user ID and password), and/or the particular command requested to be enabled. In some instances, credentials, affinity, and/or other information regarding the host device 108 and/or the SSD 100 can be looked up in a database and compared to information contained in the unsigned C2 packet. If the routine 570 determines that authorization should be granted, the routine will ultimately sign the C2 packet with a vendor signature, as described below. If authorization is not granted, however, the routine 570 can send a response to the host device 108 and/or the SSD 100 indicating that the request was denied.

In one aspect of the various embodiments of the present technology, the device vendor 120 derives the vender authorization signature by creating a first digest based on information contained in the unsigned C2 packet (block 573), such as information contained in the header field and/or the payload field of the unsigned packet. The first digest can include, for example, a hash code derived using a hash table and/or hash function. The routine 570 then encodes (e.g., encrypts) the first digest using, e.g., a hardware security module (HSM), or other suitable cryptographic processor, to produce a unique code (block 574). In some embodiments, an HSM can hold private/public key pairings, such as private/public key pairings associated with a Rivest-Shamir-Adleman (RSA) algorithm. In other embodiments, the HSM can encode the first digest using other suitable digital signature algorithms, such as a symmetric encryption algorithm. The routine 570 then sends the signed C2 packet to the SSD 100 via the host device 108 (block 575), with the unique code serving as the vendor signature.

The routine 570 next receives the signed C2 packet at the SSD 100 (block 576), and proceeds to determine whether the vendor signature of the signed C2 packet is valid (blocks 577 and 578). In the illustrated embodiment of FIG. 5, the routine 570 determines whether the vendor signature is valid by deriving a second digest (e.g., a hash code) from the information contained in the signed C2 packet (block 577). In particular, the routine 570 can create the second digest based on the same information used to produce the first digest at block 573 (e.g., credentials in the header field and/or the restricted command in the payload field). The routine 570 also decodes (e.g., decrypts) the vendor signature (i.e., the unique code) of the C2 packet using an algorithm (e.g. an RSA algorithm) to produce a third digest (block 578). In cases where a public/private key pairing is employed for encoding/decoding (e.g., encrypting/decrypting), the routine 570 can decode the vendor signature using a public key stored, e.g., in the internal memory 112 (FIG. 1) and/or the main memory 102 (FIG. 1) of the SSD 100. The public key stored on the SSD 100 can be different than the public key supplied by the host device 108 in the header field of the C2 packet or it can be the same.

If the derived second digest is equivalent to the third digest (i.e., the decoded vendor signature), the routine 570 can recognize that the C2 packet is valid (block 579). If the derived second digest is not equivalent to the decoded vendor signature, however, the vendor signature cannot be validated and the routine 570 can deny the request. In some embodiments, once the vendor signature is validated, the routine 570 can check other packet parameters to ensure the signed C2 packet is not corrupted. For example, the SSD 100 can check any credentials contained in the header field of the signed C2 packet to, e.g., ensure that the packet was sent to the correct SSD. If the parameters or credentials are invalid or otherwise unacceptable, the SSD 100 can also deny the request. Otherwise, the SSD 100 can proceed to perform the restricted command of the C2 packet (block 580).

Figure 6:
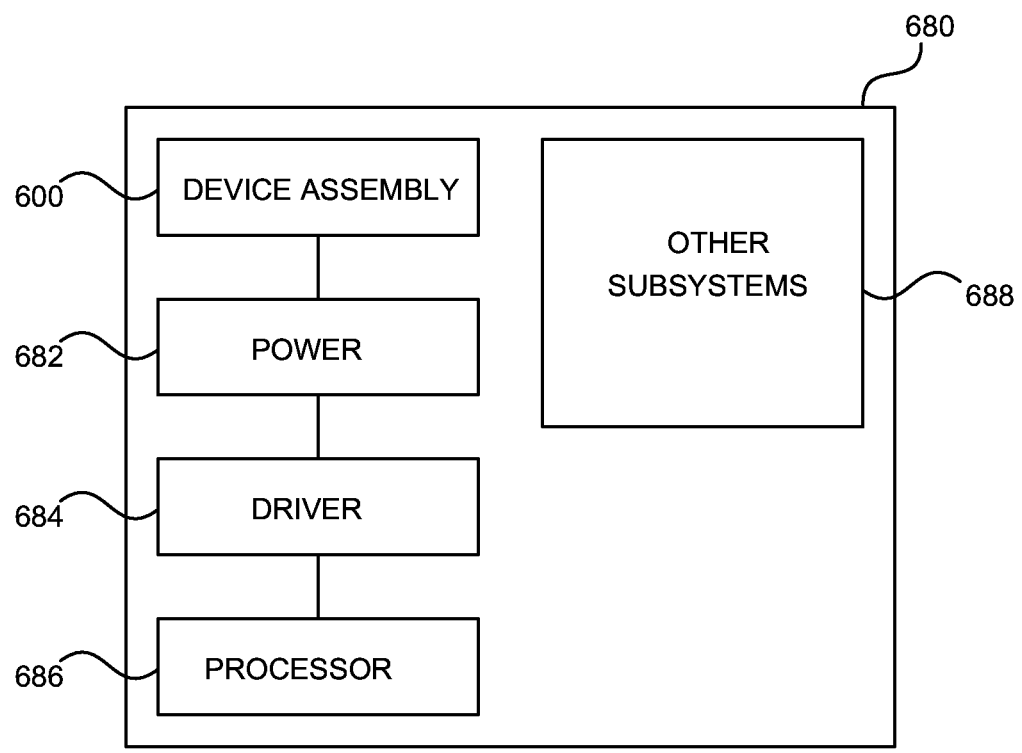
FIG. 6 is a schematic view of a system that includes a memory device in accordance with embodiments of the present technology.

FIG. 6 is a schematic view of a system that includes a memory device in accordance with embodiments of the present technology. Any one of the foregoing memory devices described above with reference to FIGS. 1-5 can be incorporated into any of a myriad of larger and/or more complex systems, a representative example of which is system 680 shown schematically in FIG. 6. The system 680 can include a memory device 600, a power source 682, a driver 684, a processor 686, and/or other subsystems or components 688. The memory device 600 can include features generally similar to those of the memory devices described above with reference to FIGS. 1-5, and can, therefore, include various features that provide command and control access to the memory device. The resulting system 680 can perform any of a wide variety of commands, such as memory storage, data processing, and/or other suitable commands. Accordingly, representative systems 680 can include, without limitation, hand-held devices (e.g., mobile phones, tablets, digital readers, and digital audio players), computers, vehicles, appliances and other products. Components of the system 680 may be housed in a single unit or distributed over multiple, interconnected units (e.g., through a communications network). The components of the system 680 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

We claim:

1. A memory device comprising a controller and a storage memory, wherein the controller includes a processor and a controller memory operably coupled to the processor, and wherein:
the controller is configured to receive a command and control ($C^2$) packet from a remote computer, the $C^2$ packet including—
a command for the controller to change a permission status of a restricted command, and
a vendor signature,
wherein the restricted command is a command to access a restricted memory region, a command to modify firmware of the memory device, a command to overclock the memory device, a command to enable a test mode of the memory device, a command to format the storage memory, and/or a command to disable an enabled command; and
the controller memory stores instructions executable by the processor to—
determine if the vendor signature is valid, and
direct the controller to execute the command to change the permission status of the restricted command if the vendor signature is determined to be valid.

2. The memory device of claim 1, wherein the command for the controller to change the permission status of the restricted command includes (1) a command for the controller to enable a disabled restricted command, and/or (2) a command for the controller to disable an enabled restricted command.

3. The memory device of claim 1, wherein the command for the controller to change the permission status of the restricted command includes the command for the controller to enable the disabled restricted command, and wherein the command for the controller to enable the disabled restricted command is a command to permanently enable the disabled restricted command.

4. The memory device of claim 1, wherein the command for the controller to change the permission status of the restricted command includes the command for the controller to enable the disabled restricted command, and wherein the command for the controller to enable the disabled restricted command is a command to temporarily enable the disabled restricted command.

5. The memory device of claim 4, wherein the vendor signature is determined to be valid, and wherein the instructions executable by the processor direct the controller to temporarily enable the disabled restricted command for a limited number of boot cycles and/or for a limited amount of time.

6. The memory device of claim 1, wherein the command for the controller to change the permission status of the restricted command includes the command for the controller to disable the enabled restricted command, and wherein the command for the controller to disable the enabled restricted command is a command to permanently disable the enabled restricted command.

7. The memory device of claim 1, wherein the command for the controller to change the permission status of the restricted command includes the command for the controller to disable the enabled restricted command, and wherein the command for the controller to disable the enabled restricted command is a command to temporarily disable the enabled restricted command.

8. The memory device of claim 7, wherein the vendor signature is determined to be valid, and wherein the instructions executable by the processor direct the controller to temporarily disable the enabled restricted command for a limited number of boot cycles and/or for a limited amount of time.

9. The memory device of claim 2, wherein the restricted command is one or more vendor specific commands.

10. The memory device of claim 9, wherein the command for the controller to change the permission status of the restricted command includes a command for the controller to enable all vendor specific commands in the one or more vendor specific commands.

11. The memory device of claim 1, wherein the command and/or the vendor signature corresponds to a purchase of the restricted command.

12. The memory device of claim 1, wherein the command and/or the vendor signature corresponds to a purchase of the restricted command via the internet.

13. The memory device of claim 1, wherein:
the vendor signature includes a first digest of the $C^2$ packet that has been encoded based on a private key held by the device vendor; and
the instructions are executable by the processor to—
derive a second digest based at least in part on information stored in the $C^2$ packet;
decode the vendor signature with a public key associated with the private key to produce a third digest, and
compare the third digest to the second digest to determine if the vendor signature is valid.

14. The memory device of claim 1, wherein the vendor signature is a signature of a device vendor, and wherein the device vendor is a manufacturer of the memory device.

15. The memory device of claim 1, wherein the memory device is a solid-state drive.

16. A method of operating a memory device, comprising:
receiving at least one command and control ($C^2$) packet from a remote computer, wherein the at least one $C^2$ packet includes a command to change a permission status of a restricted command,
wherein the restricted command is a command to access a restricted memory region, a command to modify firmware of the memory device, a command to overclock the memory device, a command to enable a test mode of the memory device, a command to format the storage memory, and/or a command to disable an enabled command;
determining whether the at least one $C^2$ packet has been signed by a device vendor of the memory device with a vendor signature; and
changing the permission status of the restricted command if the vendor signature is valid.

17. A system, comprising:
a remote computer of a device vendor; and
a memory device having a controller and a storage memory, wherein the remote computer is configured to send a command and control ($C^2$) packet to the controller, the $C^2$ packet including—
  a command for the controller to change a permission status of a restricted command; and
  a vendor signature,
wherein the restricted command is a command to access a restricted memory region, a command to modify firmware of the memory device, a command to overclock the memory device, a command to enable a test mode of the memory device, a command to format the storage memory, and/or a command to disable an enabled command, and
wherein the controller is configured to—
  receive the $C^2$ packet from the remote computer;
  determine if the vendor signature is valid; and
  change the permission status of the restricted command if the vendor signature is determined to be valid.

18. The system of claim 17, wherein the command for the controller to change the permission status of the restricted command includes (1) a command for the controller to enable a disabled restricted command, and/or (2) a command for the controller to disable an enabled restricted command.

19. The system of claim 17, wherein the command and/or the vendor signature corresponds to a purchase of the restricted command via the internet.

20. The system of claim 17, further comprising a host device, wherein—
  the command for the controller to change the permission status is the command to enable the disabled restricted command; and
  after the controller enables the disabled restricted command and while the disabled restricted command is enabled, the controller is configured to:
    receive the enabled disabled restricted command from the host device, and
    execute the enabled disabled restricted command without requiring further authorization.

21. The system of claim 17, further comprising a host device, wherein—
  the $C^2$ packet is a first $C^2$ packet;
  the vendor signature is a first vendor signature;
  the command for the controller to change the permission status is the command to disable the enabled restricted command; and
  after the controller disables the enabled restricted command, the controller is configured to:
    receive the disabled enabled restricted command from the host device, and
    deny executing the disabled enabled restricted command until the disabled enabled restricted command is enabled using a second $C^2$ packet having a valid second vendor signature.

* * * * *